(12) United States Patent
Dufresne de Virel et al.

(10) Patent No.: US 8,997,451 B2
(45) Date of Patent: Apr. 7, 2015

(54) ENGINE AND POD ASSEMBLY FOR AN AIRCRAFT, EQUIPPED WITH AN ANTI-ICING DEVICE INCLUDING A SOURCE OF RADIATION AND PULSE CONTROL UNIT CONNECTED TO THE SOURCE OF RADIATION

(75) Inventors: François Dufresne de Virel, Paris (FR); Michel Pealat, Paris (FR); Patrick Joyez, Cesson (FR); Bruce Pontoizeau, Paris (FR); Jean-François Lacuisse, Cesson (FR); Sylvie Wintenberger, Paris (FR)

(73) Assignee: Sagem Defense Securite, Paris (FR)

( * ) Notice: Subject to any disclaimer, the term of this patent is extended or adjusted under 35 U.S.C. 154(b) by 733 days.

(21) Appl. No.: 13/256,308

(22) PCT Filed: Mar. 12, 2010

(86) PCT No.: PCT/EP2010/053190
§ 371 (c)(1),
(2), (4) Date: Oct. 18, 2011

(87) PCT Pub. No.: WO2010/103104
PCT Pub. Date: Sep. 16, 2010

(65) Prior Publication Data
US 2012/0036826 A1 Feb. 16, 2012

Related U.S. Application Data

(60) Provisional application No. 61/172,467, filed on Apr. 24, 2009.

(30) Foreign Application Priority Data

Mar. 13, 2009 (FR) ..................................... 09 01208

(51) Int. Cl.
*F02G 3/00* (2006.01)
*B64D 15/00* (2006.01)
(Continued)

(52) U.S. Cl.
CPC ............... *B64D 15/00* (2013.01); *B64D 29/00* (2013.01); *F02C 7/047* (2013.01)

(58) Field of Classification Search
CPC .......... F02C 7/05; F02C 7/047; B65D 15/00; B65D 15/12; B65D 15/1633; B65D 2033/0233
USPC ........... 60/39.093; 416/94, 245 R; 244/134 R
See application file for complete search history.

(56) References Cited

U.S. PATENT DOCUMENTS 1,779,186 A * 10/1930 Jan Pavlecka .................. 416/94
1,824,667 A * 9/1931 Grumpelt ...................... 416/175
(Continued)

FOREIGN PATENT DOCUMENTS

GB 627885 8/1949
GB 628191 8/1949
(Continued)

*Primary Examiner* — William H Rodriguez
*Assistant Examiner* — Rene Ford
(74) *Attorney, Agent, or Firm* — Muncy, Geissler, Olds & Lowe, P.C.

(57) ABSTRACT

An engine and pod assembly for an aircraft includes a pod receiving an engine having an air intake. A rotating nose cone extends on the nose cone, as well as a device for limiting the formation of ice. The device includes means for creating a circumferential heterogeneity of ice on the nose cone.

12 Claims, 1 Drawing Sheet

(51) Int. Cl.
*B64D 29/00* (2006.01)
*F02C 7/047* (2006.01)

(56) References Cited

U.S. PATENT DOCUMENTS

| | | | | |
|---|---|---|---|---|
| 2,472,357 | A | * | 6/1949 | Wolf .............................. 416/175 |
| 2,812,899 | A | | 8/1950 | Meschino |
| 2,630,965 | A | * | 3/1953 | Greatrex et al. .............. 415/115 |
| 3,794,444 | A | * | 2/1974 | Campbell et al. ......... 416/201 R |
| 4,393,650 | A | * | 7/1983 | Pool ........................... 60/39.093 |
| 6,206,325 | B1 | | 3/2001 | Nunnally |
| 6,447,255 | B1 | * | 9/2002 | Bagnall et al. ............. 416/245 R |
| 6,561,763 | B2 | * | 5/2003 | Breakwell ....................... 416/94 |
| 2008/0279688 | A1 | | 11/2008 | Jensen et al. |
| 2011/0236217 | A1 | * | 9/2011 | Bottome ................... 416/245 R |

FOREIGN PATENT DOCUMENTS

| | | |
|---|---|---|
| GB | 641363 | 8/1950 |
| WO | WO 2005/073539 | 8/2005 |

* cited by examiner

ENGINE AND POD ASSEMBLY FOR AN AIRCRAFT, EQUIPPED WITH AN ANTI-ICING DEVICE INCLUDING A SOURCE OF RADIATION AND PULSE CONTROL UNIT CONNECTED TO THE SOURCE OF RADIATION

CROSS-REFERENCE TO RELATED APPLICATIONS

This application is a 371 National Stage of PCT/EP2010/053190, filed on Mar. 12, 2010, for which priority is claimed under 35 U.S.C. §119; which claims priority of U.S. Provisional Patent Application No. 61/172,467 filed on Apr. 24, 2009 under 35 U.S.C. §119(e), and Application No. 09 01208 filed in France on Mar. 13, 2009 under 35 U.S.C. §119; the entire contents of all of which are hereby incorporated by reference.

BACKGROUND OF THE INVENTION

Field of the Invention

The present invention relates to an engine and pod assembly for an aircraft. The invention is more particularly adapted to jet engines and other turbojet engines.

An engine for an aircraft of the straight flow turbojet or double fan types includes an air intake, a compressor with several stages, a combustion chamber, a compressor-driving turbine and a jet pipe propelling nozzle. In the air intake, an inlet nose cone extends which is mounted on a shaft driven into rotation by the turbine. The engine is received in a pod fixed to the aircraft.

It is known that the formation of ice, more particularly on the nose cone of the motor, is a risk for the motor when pieces of ice of a relatively significant size detach from the nose cone of the engine and go into the compressor where they may deteriorate the blades. Ice may form when the aircraft flies through freezing fog or a particularly cold cloud or during flying very low in Polar Regions.

This is the reason why engines are equipped with devices preventing or limiting the formation of ice.

Some devices include a hot fluid circuit running under the parts of the engine and the pod whereon ice may form. The hot fluid is, for example, air collected in the vicinity of the combustion chamber or engine lubrication fluid. Devices of the same type include an electric circuit including heating resistors.

It is thus disclosed in documents U.S. Pat. No. 2,812,899 A, US 2008/0279688 A1 and WO 2005/073539 A1 hot fluid circuit bringing hot fluid close to the nose cone in order to uniformly distribute the hot fluid in the vicinity of the whole surface thereof.

In propeller engine, it is also known, from documents GB 641 363 A and GB 627 885 A, to equip the propeller spinner with electrically conductive parts connected to an electrical power supply for uniformly heating the spinner and preventing ice formation thereon.

The integration of such devices in the engine or the pod is complicated and complicates the structure thereof. These solutions also need to be supplied with a relatively high power to be efficient.

Other devices include a microwave transmitter directed towards the parts on which ice is likely to form. Such devices are relatively inefficient, more particularly because of the low directivity thereof and prove to consume lots of energy to obtain an efficient de-icing.

In addition, the integration thereof in existing engines is difficult (modification of "noble" parts, necessity to re-qualify, etc.).

In aircraft screw propeller, it is also known, for example in document GB 628 191 A, to fit stationary scrapers around the spinner of the propeller in such a way that the scrapers prevent the formation of a thick icy layer.

Summary of the Invention

One object of the invention is to provide means for improving the efficiency of an anti-icing device while reducing the consumption thereof and which is easily integrated.

For this purpose, an engine and pod assembly for an aircraft is provided according to the invention, including a pod receiving an engine having an air intake wherein a rotating nose cone extends as well as a device for limiting the formation of ice on the nose cone, with the device including means for creating a circumferential heterogeneity of ice on the nose cone.

Then, the circumferential heterogeneity of the formation of ice prevents ice from forming a uniform layer on the nose cone. The result is an asymmetry of rotation of the ice layer. This causes a rough off-balance which generates vibrations of the nose cone favouring the detachment of ice. Ice is then ejected in small pieces by the centrifuge force under the effect of the rotation of the nose cone. In addition, the circumferential heterogeneity of ice prevents ice from forming a homogeneous and symmetric shroud on the nose cone, so that the resistance of the anchoring of ice is lessened. Ice can then detach under the effect of the centrifuge force. The growth of ice is then limited and the invention favours the detachment of ice before the latter forms large pieces. Generally speaking, this makes it possible to limit the consumption of energy with a view to preventing the formation of ice and/or eliminating a layer of ice. It is well understood that the device is also efficient against frost.

According to various embodiments of the nose cone:
- the nose cone includes an external surface including a portion with a high heat transfer coefficient and a portion with a low heat transfer coefficient,
- the nose cone includes an external surface including a portion absorbing an electromagnetic radiation and a portion reflecting the electromagnetic radiation,
- the nose cone includes an external surface including a rough portion and a smooth portion.

Thus, the external surface of the nose cone includes portions having different physical properties to favour the circumferential heterogeneity of the formation of ice. Such different physical properties may result from the nature of the material or materials composing the nose cone, the processing or machining applied thereto or a coating covering the same.

According to a particular characteristic, the pod includes a source of radiation able to at least start the melting of ice, the source of radiation being directed to the nose cone and connected to a pulse control unit synchronised with the rotation of the nose cone, so that the rotation hits a portion only of the external surface of the nose cone and preferably the pulse control unit is synchronised so that the hit portion is substantially equal to one half of the external surface of the cone.

Thus, the source of radiation is controlled to hit always the same portion of the nose cone so as to directly melt (or fragment or weaken) ice only on this portion. This portion may vary between ⅓ and ⅔ of the front surface of the cone.

According to two embodiments of the source of radiation:
the source of radiation is a source of electromagnetic radiation and includes a laser diode or a microwave transmitter,
the source of radiation includes at least one ultrasonic transmitter.

This type of radiation has characteristics enabling the melting of ice.

Other characteristics and advantages of the invention will appear upon reading the following description of a particular non-limitative embodiment of the invention.

BRIEF DESCRIPTION OF THE DRAWINGS

Reference will be made to the appended drawings, among which.

DETAILED DESCRIPTION OF THE INVENTION

Figure 1:
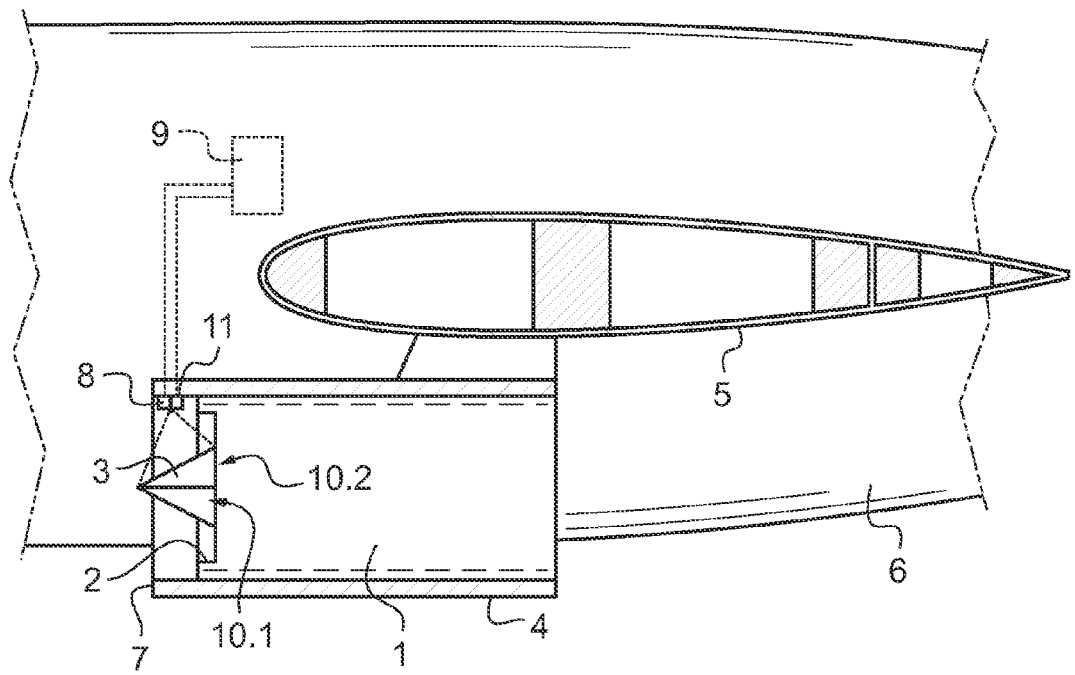
FIG. 1 is a schematic view in axial cross-section of an assembly according to the invention.
Figure 2:
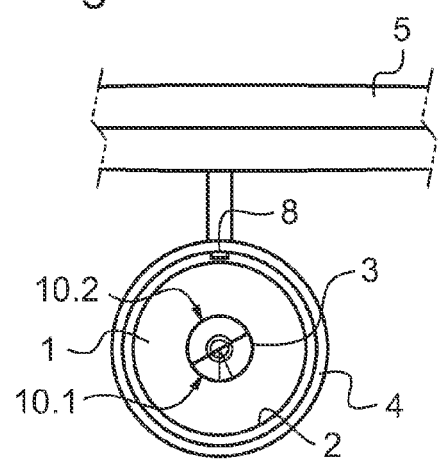
FIG. 2 is a front view of such assembly.

While referring to the figures, an assembly according to the invention includes an engine of the turbojet type indicated by 1. The engine 1 successively and axially includes an inlet 2, a compressor, a combustion chamber, a turbine and an exhaust nozzle. In the inlet 2 is mounted a nose cone 3 fixed to a shaft driven into rotation by the turbine of the engine 1. The engine 1 is roughly symbolised by a rectangle and will not be described here since the structure thereof is known per se and is not the subject of the present invention.

The assembly includes a pod 4 receiving the engine 1. The pod 4 is fixed to a wing 5 of said aircraft 6 and includes a leading edge 7 surrounding the inlet opening 2 of the engine 1.

Finally, the assembly includes a device for limiting the formation of ice on the nose cone 3.

Here this device includes means associated with the nose cone 3 and means associated in the vicinity of the leading edge 7 of the pod 4.

In the vicinity of the leading edge 7, the pod 4 is equipped with a source of radiation 8 able to at least start the melting of ice and oriented towards the nose cone 3. The source of radiation 8 is a laser diode sized so as to heat the external surface of the nose cone 3 sufficiently to start the melting of ice. The source of radiation 8 is connected to a pulse control unit 9 synchronised with the rotation of the nose cone 3, so that the radiation transmitted by the source of radiation 8 hits a portion only of the external surface of the nose cone 3.

The nose cone 3 has an external surface including a portion 10.1 and a portion 10.2 having different physical properties. The portion 10.1 absorbs the electromagnetic radiation and the portion 10.2 reflects the electromagnetic radiation. The absorption of the electromagnetic radiation by the portion 10.1 causes the heating of the portion 10.1, whereas the reflection of the electromagnetic radiation by the portion 10.2 limits the heating thereof. Both portions may be obtained by depositing different coatings on the nose cone 3. The portions 10.1, 10.2 represent each one half of the nose cone 3.

The synchronisation of the pulse of the source of radiation 8 with the rotation of the nose cone 3 may be obtained by continuously transmitting the radiation and by detecting the reflection of the electromagnetic radiation by the portion 10.2 using an optical sensor 11 mounted in the vicinity of the leading edge 7 of the pod 4 and connected to the pulse control unit 9. Such a phase of synchronisation may be periodically carried out. Further to this phase of synchronisation, during a phase of nominal operation, the pulse control unit 9 controls the source of radiation 8 to transmit the radiation only when the portion 10.1 is opposite the source of radiation 8. The synchronisation may be periodically or continuously carried out on each revolution. It is also possible to obtain a low lighting for the detection and a strong lighting in nominal operation or to use different frequencies in these two phases.

Of course, the invention is not limited to the embodiment described but concerns any alternative solution within the scope of the invention such as described in the claims.

As an alternative solution, the nose cone includes an external surface including a portion with a high heat transfer coefficient and a portion with a low heat transfer coefficient to favour as much as possible a different anchoring of ice on these two portions.

As another alternative solution, the nose cone includes an external surface including a rough portion and a smooth portion to have a different adherence of ice on these two portions.

It is possible to associate a continuously or discontinuously transmitting source of radiation.

The portions 10.1, 10.2 may have a surface area smaller or greater than half the external surface of the nose cone.

The portions of the cone having different properties may extend on the front part of the nose cone or on the whole length thereof.

The source of radiation may include at least one microwave transmitter, at least one source of infrared radiation or at least an ultrasonic transmitter instead of the laser diode (using several diodes can also be considered in order to increase the transmitted flux). The source of microwave radiation or laser is sized so as to directly melt ice and/or to go through the ice and heat the external surface of the nose cone so as to melt ice at the interface between the latter and the nose cone.

The size of the source of radiation can be such as to prevent the formation of ice or to break or at least weaken the structure of the formed ice. In a particular embodiment, (more particularly if a pulse optical radiation generated by one or several laser diode or diodes is used), the optical radiation can be focused in the vicinity of the surface of the nose cone to create a plasma and cause incipient breaks or even the fractioning of the formed ice. Such device can be equipped with a device for deflecting the beam of the diasporameter type or an equivalent so as to be able to vary the position of the impact on the cone.

The source of radiation can transmit continuously or discontinuously. The source of radiation may have a spectrum covering the spectral band of absorption of ice.

Several sources of radiation distributed on the whole or a part of the internal parameter of the pod can be used.

The device may include means associated with the nose cone only or with the pod only.

The pod can be so arranged as to enable the fixation of the engine to the wing or the aircraft fuselage.

The nose cone may be externally provided with grooves extending axially from the top of the nose cone to the peripheral edge thereof and possibly tapering in the direction thereof.

It is possible to use for the heated and/or lit and/or irradiated part of the nose cone a material having a maximum absorption spectrum with respect to the radiation transmitted.

When the nose cone includes an external surface including a portion with a high heat transfer coefficient and a portion with a low heat transfer coefficient, the portions are preferably thermally isolated from each other.

When the nose cone includes an external surface including a portion absorbing an electromagnetic radiation and a portion reflecting an electromagnetic radiation, the portions preferably have a different emissivity in a spectral band of the radiation.

The invention claimed is:

1. An engine and pod assembly for an aircraft, comprising:
a pod receiving an engine with an air intake through which a rotating nose cone extends, the pod including a device for limiting the formation of ice on the nose cone,
wherein the device includes means for creating a circumferential heterogeneity of ice on the nose cone, and
wherein the pod includes a source of radiation able to at least prevent the formation of ice and directed to the nose cone, with the source of radiation being connected to a pulse control unit synchronized with the rotation of the nose cone so that the radiation only hits a portion of the external surface of the nose cone.

2. The assembly according to claim 1, wherein the source of radiation is able to at least start the melting of ice.

3. The assembly according to claim 1, wherein the pulse control unit is synchronised so that the portion hit is substantially equal to one half of the external surface of the nose cone.

4. The assembly according to claim 1, wherein the source of radiation is a source of electromagnetic radiation.

5. The assembly according to claim 4, wherein the source of radiation includes at least a laser diode.

6. The assembly according to claim 5, wherein the diode transmits a beam focused in the vicinity of the external surface of the nose cone.

7. The assembly according to claim 4, wherein the source of radiation includes at least a microwave transmitter.

8. The assembly according to claim 1, wherein the source of radiation includes at least an ultrasonic transmitter.

9. The assembly according to claim 1, wherein the nose cone includes an external surface including an absorbing portion absorbing an electromagnetic radiation and a reflecting portion reflecting the electromagnetic radiation.

10. The assembly according to claim 9, wherein a detector is mounted on the pod and connected to the pulse control unit to detect the radiation reflected by the reflecting portion and the pulse control unit is configured to perform a phase of synchronisation in which the radiation is continuously transmitted and a phase of nominal operation wherein the pulse control unit controls the source of radiation to transmit the radiation only when the absorbing portion is opposite the source of radiation.

11. An assembly according to claim 9, wherein the portions have a different emissivity in a spectral band of the radiation.

12. The assembly according to claim 1, including a member for deflecting the radiation towards the nose cone.

* * * * *